April 28, 1970  A. W. BYRD  3,509,386
HEAT PIPE THERMIONIC DIODE POWER SYSTEM
Filed Sept. 6, 1967  2 Sheets-Sheet 1

INVENTOR.(S)
AMBROSE W. BYRD
BY
ATTORNEYS

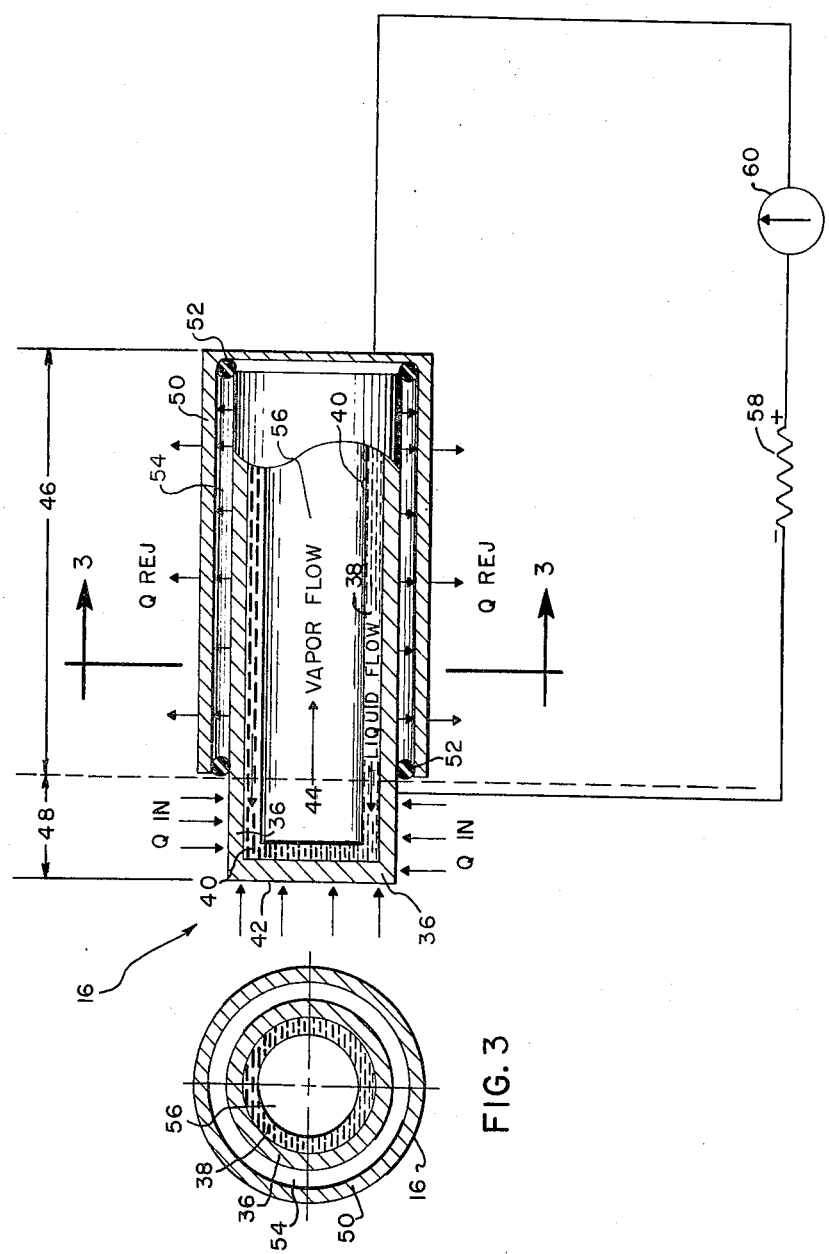

United States Patent Office 3,509,386
Patented Apr. 28, 1970

3,509,386
HEAT PIPE THERMIONIC DIODE POWER SYSTEM
Ambrose W. Byrd, Huntsville, Ala., assignor to the United States of America as represented by the Administrator of the National Aeronautics and Space Administration
Filed Sept. 6, 1967, Ser. No. 666,553
Int. Cl. H01j 45/00
U.S. Cl. 310—4                2 Claims

ABSTRACT OF THE DISCLOSURE

A power system utilizing a number of thermionic plasma diodes in parallel. The diodes each incorporate a cathode which is integral to a heat pipe and is heated by an isotopic heat source through the highly efficient heat transfer function of the heat pipe. The system employs a circulatory cooling system utilizing a liquid metal as a coolant.

BACKGROUND OF THE INVENTION

The invention described herein was made by an employee of the United States Government and may be manufactured and used by or for the Government for governmental purposes without the payment of any royalties thereon or therefor.

Field of the invention

The invention relates to an electric power system and more particularly to an electric power system utilizing thermionic diodes which are heated by heat pipes.

Description of the prior art

A heat pipe is a device normally used to transport heat from its source and transfer the heat to a specific environment. It is composed of a pipe sealed at each end, enclosing a wick and a heat transfer fluid. The wick lies along the inner periphery of the wall and extends the length of the pipe. At one end of the device heat is absorbed by vaporization of a heat transfer fluid. The vapor then expands and permeates the pipe. Since a portion of the pipe is being used as a radiating fin, the vapor condenses along the length of the tube, giving up its latent heat of vaporization in the process. The condensate is returned to the vaporizer by means of capillary flow through the annular wick.

The thermionic emission of electrons from a heated metal is a well known physical phenomenon. This phenomenon is made use of in all electron tubes for radio, television, amplifiers, etc. The most recent application has been in the direct conversion of heat energy to electrical energy and is most promising for space power use since it eliminates the need for rotating machinery in the conversion process.

How the cathode of a thermionic diode is heated makes no difference. Any method of heating is adequate as long as the temperatures are high enough for electrons to be driven from the emitter surface. Use is made of the cathode (emitter) by surrounding it with an electron collector, hereafter called an anode, which must operate at a lower temperature than the cathode. If an external electric load is connected between the anode and the cathode a current will be made to flow. The cathode and anode must be physically and electrically separated. Physical separation is accomplished by spacing the elements by a small gap on the order of .002 inch to .015 inch, while electrical separation is accomplished through the use of electrical insulation.

In the development work leading to the present invention, the inventor believed that the heat pipe could be made into a thermionic cathode (emitter). In order to do so, it would be necessary to construct the heat pipe from a high temperature emitting material, such as tungsten or molybdenum. Such a thermionic cathode might then be utilized by surrounding it with an anode on the radiating end, to form a diode.

The proposed heat pipe cathode would be advantageous when used with radioactive isotopes, particularly alpha emitters in the transuranium group, because of the low specific power of the isotopes (.5 watt per gram). The power density of the isotopes is too low to heat an optimum size cathode (1 inch diameter x 2 inches long) to a temperature level high enough for electron emission. However, if a large amount of the isotope is encapsulated, the heat generated will be great enough to operate the heat pipe thermionic diodes. In this case, however, sufficient insulation, such as pyrolytic graphite, must be used to direct the isotopic heat to the heat pipes. The heated end of the cathode could be inserted into the coolant of a nuclear reactor or any other heat source and properly do its job.

Past isotopic thermionic diodes have been constructed with the isotope in the form of a cylinder with one end and the periphery insulated in order to direct the heat flow to the uninsulated end which formed the emitting surface. This was necessary in order to raise the temperature at this end due to the low specific power (watts per gram) of the isotope. In the proposed combination of a heat pipe with a thermionic cathode, however, such a configuration would be unnecessary in order to utilize an isotopic heat source to heat a cathode.

SUMMARY OF THE INVENTION

Accordingly, it is an object of this invention to utilize a heat pipe to heat the cathode of a thermionic diode.

A further object of the invention is to construct a heat pipe made of a high temperature emitting material so that the heat pipe itself may be utilized as the cathode of a thermionic diode.

Yet another object of this invention is to develop a power system utilizing thermionic diodes having heat pipes as cathodes and utilizing a low power density heat source.

These and other objects are accomplished in the present invention which provides an electrical power system utilizing a plurality of thermionic diodes each of which is heated by a heat pipe. The system includes a heat source which is enclosed in a container. The diodes are disposed on the outer surface of the heat source container. Both the heat source container and the diodes are enclosed in a pressure vessel which is connected to a cooling system.

BRIEF DESCRIPTION OF THE DRAWINGS

The invention will be more fully understood by the following detailed description when taken together with the accompanying drawings in which:

FIGURE 2 is a longitudinal sectional view of the heat pipe diode.

FIGURE 3 is an end sectional view of the heat pipe diode.

DESCRIPTION OF THE PREFERRED EMBODIMENT

Figure 1:
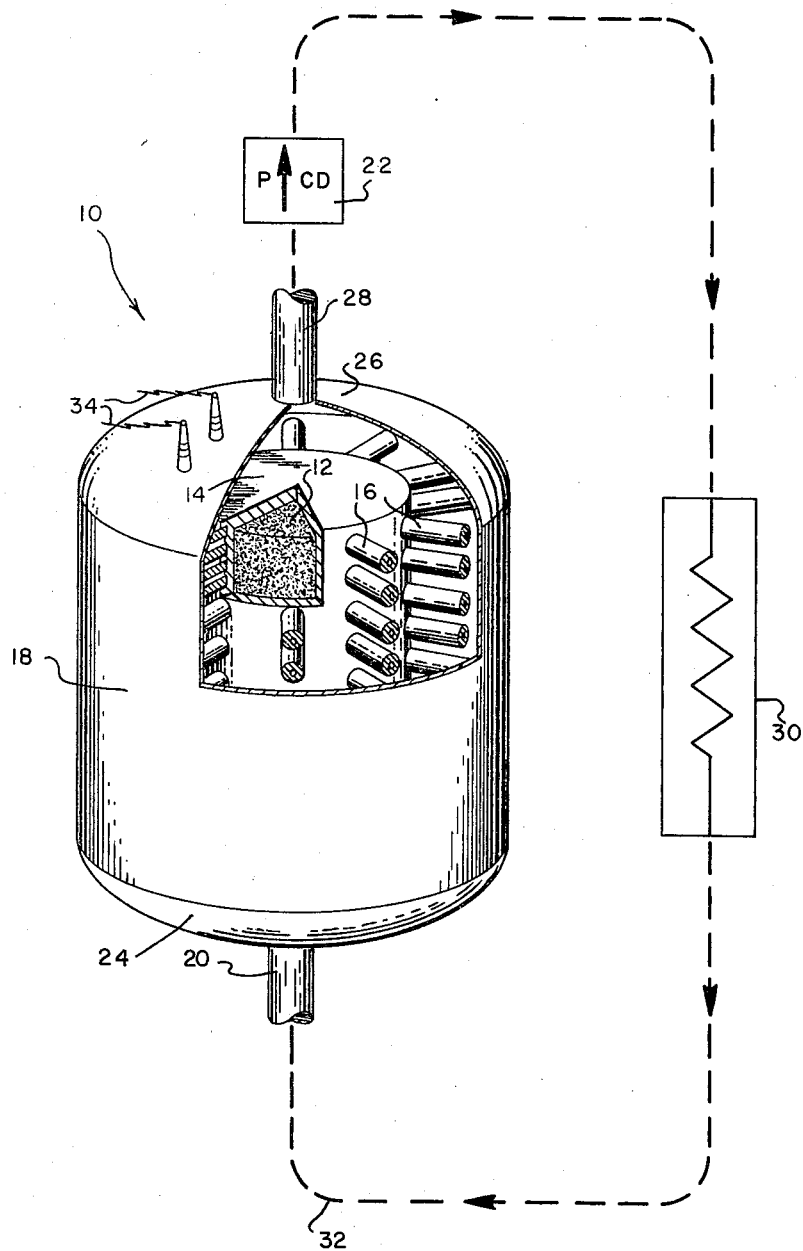
FIGURE 1 is a perspective view of the power system with portions of the pressure vessel and the heat source container cut away.

With continued reference to the accompanying figures wherein like numerals designate similar parts throughout the various views and with initial attention directed to FIGURE 1, there is illustrated a typical embodiment of the heat pipe thermionic diode power system designated generally by the numeral 10. A heat source 12 which is preferably composed of radioactive isotopes is enclosed in a container 14. The heated ends of the heat pipe plasma diodes 16 are embedded in the heat source container 14. The heat source 12, container 14, and heat pipe diodes 16 are surrounded by a pressure vessel 18 for total containment. The heat pipe diodes 16 are connected in parallel so that the total power output of the power system 10 may be connected to an external load (not shown).

A circulatory cooling system is used to cool the heat source 12 and the heat pipe diodes 16. Liquid metal coolant 20 is circulated by electro-magnetic pump 22 through the pressure vessel 18, out of the top 26 of the pressure vessel 18, through output cooling line 28, through radiator 30, through input cooling line 32, and back into the bottom 24 of the pressure vessel 18.

Referring again to FIGURE 1, one cycle of operation of the heat pipe thermionic diode power system 10 is as follows: heat flows from radioactive heat source 12 to cause current to flow in thermionic heat pipe diodes 16 which are embedded in the heat container 14. Output current flows to output terminals 34 for connection to an external load (not shown). Electro-magnetic pump 22 cools the heat source 12 and heat pipe diodes 16 by pumping liquid metal coolant 20 through pressure vessel 18 and in sequence through output cooling line 28, radiator 30, cooling line 32 and back to pressure vessel 18.

Looking now to FIGURE 2 of the drawings, the structural details of the heat pipe plasma diodes 16 may be seen. The heat pipe 36 is a pipe which is sealed at each end and encloses a wick 38 and heat transfer fluid 40. At the heated end 42 of the device, heat is absorbed by vaporization of the heat transfer fluid 40. The vapor 44 forms from fluid 40, then expands, and permeates the heat pipe 36. Since a portion of the heat pipe 36 is being used as a radiating fin, the vapor 44 condenses along the length of the heat pipe 36, giving up its latent heat of vaporization and condensing to fluid 40 in the condenser section 46 of the heat pipe 36. The condensed fluid 40 is returned to the vaporizer section 48 in the heated end 42 of the heat pipe 36 by means of capillary flow through the annular wick 38. The heat pipe 36 is utilized as a thermionic cathode by constructing it from a high temperature emitting material such as tungsten or molybdenum. Then, when heat is furnished to the heat pipe 36 at its heated end 42 the opposite end or condenser section 46 emits electrons. An anode 50 is positioned adjacent to the heat pipe condenser section (cathode) 46. Preferably, the anode 50 is a cylindrical cap which fits over the end of the heat pipe 36. The anode 50 is insulated from the heat pipe condenser section (cathode) 46 by annular insulating rings 52 made of a suitable insulating material such as, for example, alumina.

The sectional view of the heat pipe diodes shown in FIGURE 3 illustrates how the anode 50 encloses the heat pipe 36 with an interelectrode space 54. Inside the heat pipe 36 is the wick 38 and the open center area 56 of the condenser section 46 (FIGURE 2).

One cycle of operation of the heat pipe thermionic diode follows: heat is absorbed at heated end 42 of heat pipe 36. Heat transfer fluid 40 absorbs heat and is changed to vapor 44 and moves under vapor pressure to condenser section 46 of the heat pipe 36 where it condenses back to fluid 40. In condensing, vapor 44 gives up heat which is absorbed by condenser section 46. The heating of condenser section 46 causes it to emit electrons, which flow to anode 50. The cathode 46 and anode 50 furnish power to external load 58 in series with meter 60. When vapor 44 condenses back to fluid 40, the fluid (condensate) 40 returns to the vaporizer section 48 by means of capillary flow through the annular wick 38, thus completing the heat transfer cycle.

The heat pipe thermionic diodes described above weigh less per electrical watt than other diodes presently in use because of the high thermal conductivity of the heat pipe (500 times greater than copper) and the lower weight of the heat pipe. Under actual test conditions, heat pipes have been operated with the heated end eleven degrees higher than the condensing end, pumping against the normal gravity field. Therefore, heat pipes will pump in a zero-G condition.

As far as has been determined experimentally to date the heat transfer process is nearly isothermal with measured temperature differences about .04 degree K per centimeter along the heat pipe length.

As mentioned previously, a principal application of the heat pipe thermionic diode lies in its being used with an isotope heat source, such as $Pu^{238}$, $Cm^{242}$, $Cm^{244}$, and $Po^{210}$, each of which is an alpha emitter, to produce electrical power for deep space voyages.

Lithium has been chosen for the coolant 20, as well as the heat pipe working fluid 40, because of its low density, low vapor pressure at elevated temperatures, high specific heat, and the attendant low pumping power requirements. The operating temperatures are: 1800° C. for the emitter and 800° C. for the anode. These temperatures give a net thermal efficiency of approximately 10 percent. In order to reach this efficiency, Cesium gas at 300°–400° C. will be introduced from a common heated reservoir (not shown) through piping into the interelectrode space 54 to reduce the space charge.

If the power system described above is used in space power applications, helium gas formed by alpha particle decay during the mission will be vented to space through a known type of pressure relief valve with a micronic filter (not shown).

From the foregoing, it may be seen that applicant has invented a novel electric power system utilizing a specifically designed heat pipe which may be used as a thermionic emitter. Because of the extremely high heat transfer efficiency of the heat pipe diodes the system makes possible an efficient electric power system utilizing low specific power isotopes as a heat source for its thermionic diodes. The system described is a low voltage, high current power system. This type of power output is dictated by the fact that a number of diodes are embedded in a common material containing the heat source, thereby precluding series connection and forcing parallel connection of the diodes for power use. Therefore, this power system may be used in space power applications to drive a magneto-hydynamic thruster, which requires a high current source. However, the power system may also be used with power conditioning in other applications, if desired.

Obviously, numerous modifications and variations of the present invention are possible in the light of the above teachings. It is therefore to be understood that, within the scope of the attendant claims, the invention may be practiced otherwise than is specifically described.

What is claimed is:

1. A device for generating electrical energy comprising:
   (a) a pressure vessel;
   (b) an isotopic heat source;
   (c) a container for said heat source, said container being positioned within said pressure vessel;
   (d) a plurality of plasma diodes disposed on the outer surface of said heat source container, each said diode comprising:
       (1) a heat pipe, one end of said heat pipe being embedded in the surface of said heat source container, and the opposite end extending directly away from said heat source container, said heat pipe being capable of acting as a cathode when heated;
       (2) an anode positioned adjacent to said heat pipe at said opposite end of said heat pipe, said anode comprising a cylinder, having one closed end, which fits over the said opposite end of the said heat pipe;

(3) at least one electrical insulator positioned between said heat pipe and said anode, for providing an interelectrode space;

(4) a gas positioned in the interelectrode space between said heat pipe and said anode, for reducing the effect of space charge;

(e) a layer of heat insulation, disposed on the outer surface of said heat source container, between said diodes, for directing the isotopic heat to said diodes;

(f) a cooling system connected to said pressure vessel, for cooling said diodes, said cooling system comprising:

(1) an input pipe connected to one side of said pressure vessel;

(2) an output pipe connected to an opposite side of said pressure vessel;

(3) a pump connected in series in said system;

(4) a radiator connected to said input and output pipes;

(5) a liquid coolant flowing through said other elements of said cooling system and also flowing through the pressure vessel around said diodes to complete its cycle and cool the said diodes.

2. The device for generating electrical energy of claim 1 wherein each said heat pipe comprises:

(a) a cylindrical section of pipe having two closed ends;

(b) a fluid contained inside said pipe, for removing heat from the pipe at its end embedded in said heat source container, through vaporization of said fluid, and discharging heat to the pipe at its said opposite end, through condensation of said fluid;

(c) a wick positioned along the inner surface of said pipe for returning said fluid from said opposite end to said embedded end;

(d) the heat discharged to the pipe at the said opposite end being effective to cause the said opposite end of the heat pipe to act as a cathode.

References Cited

UNITED STATES PATENTS

| | | | |
|---|---|---|---|
| 3,054,914 | 9/1962 | Hatsopoulos et al. | 310—4 |
| 3,093,567 | 6/1963 | Jablonski et al. | 310—4 X |
| 3,113,091 | 12/1963 | Rasor et al. | 310—4 |
| 3,201,619 | 8/1965 | Gleason et al | 310—4 |
| 3,234,412 | 2/1966 | Sankovich et al. | 310—4 |
| 3,243,613 | 3/1966 | Grover | 310—4 |
| 3,252,015 | 5/1966 | Johnson | 310—4 |
| 3,279,028 | 10/1966 | Hall et al. | 29—25.13 |
| 3,302,042 | 1/1967 | Grover et al. | 310—4 |
| 3,368,084 | 2/1968 | Hall | 310—4 |
| 3,378,449 | 4/1968 | Roberts et al. | 165—1050 X |
| 3,229,759 | 1/1966 | Grover | 165—105 |
| 3,426,220 | 2/1969 | Block et al. | 310—4 |

MILTON O. HIRSHFIELD, Primary Examiner

D. F. DUGGAN, Assistant Examiner

U.S. Cl. X.R.

165—105